Dec. 30, 1958 — R. E. McLEAN — 2,866,263
ROTARY DRIVE WHEEL TYPE CAN OPENER
Filed Oct. 3, 1956 — 6 Sheets-Sheet 1

Inventor
Robert E. McLean
By Thos. E. Scofield
Attorney

Dec. 30, 1958 R. E. McLEAN 2,866,263
ROTARY DRIVE WHEEL TYPE CAN OPENER
Filed Oct. 3, 1956 6 Sheets-Sheet 2

Inventor
Robert E. McLean

Dec. 30, 1958   R. E. McLEAN   2,866,263
ROTARY DRIVE WHEEL TYPE CAN OPENER
Filed Oct. 3, 1956   6 Sheets-Sheet 3

Inventor
Robert E. McLean
By Thos. E. Scofield
Attorney

Dec. 30, 1958 R. E. McLEAN 2,866,263
ROTARY DRIVE WHEEL TYPE CAN OPENER
Filed Oct. 3, 1956 6 Sheets-Sheet 4

Inventor
Robert E. McLean
By Thos. E. Scofield
Attorney

Dec. 30, 1958　　　　R. E. McLEAN　　　　2,866,263
ROTARY DRIVE WHEEL TYPE CAN OPENER
Filed Oct. 3, 1956　　　　　　　　　　　6 Sheets-Sheet 5

Inventor
Robert E. McLean
By Thos. E. Scofield
Attorney

Dec. 30, 1958         R. E. McLEAN         2,866,263
ROTARY DRIVE WHEEL TYPE CAN OPENER
Filed Oct. 3, 1956                          6 Sheets-Sheet 6

Inventor
Robert E. McLean

United States Patent Office 2,866,263
Patented Dec. 30, 1958

2,866,263

ROTARY DRIVE WHEEL TYPE CAN OPENER

Robert E. McLean, Kansas City, Mo., assignor to John C. Hockery, Kansas City, Kans., trustee Application October 3, 1956, Serial No. 613,673

8 Claims. (Cl. 30—9)

This invention relates generally to the class of can openers and is directed particularly to improvements in can openers of the rotary drive wheel type.

A particular object of the present invention is to provide in a rotary drive wheel type can opener, certain desirable and advantageous improvements in openers of this type, particularly the structures disclosed in my prior Patents No. 2,592,934 of April 15, 1952, No. 2,592,937 of April 15, 1952, and No. 2,644,228 of July 7, 1953, such improvements embodying constructions in which, during the operation of the device, the side wall of a can, the can driving wheel, and a cone formed coaxial and integral with the can driving wheel are wedged between the disk cutter and a cone formed coaxial and integral with the disk cutter.

Another object of the invention is to provide a can opener of the character stated wherein are provided split bearings for the shaft of the can driving wheel and for the shaft of the disk cutter, to permit manufacture of the disk cutter, its shaft and the cone coaxial therewith as a single piece, without fabrication and to permit manufacture of the can driving wheel, its shaft and the cone wheel coaxial therewith as a single piece, without fabrication, whereby there is provided a better alignment of these parts, and the use of journals of smallest possible diameter is made feasible, for increased ease of operation.

A further object of this invention is to provide in a can opener of the character stated, a bearing for the can driving wheel which is designed to have limited oscillation on an axis extending lengthwise of the device, with spring means resiliently urging the said oscillatable bearing to seat in such a manner that the can driving wheel will engage under the rim or flange of a can as it is brought into can engaging position, without any action on the part of the operator other than the act of moving together a pair of handles by which relative movement of the can driving wheel and rotary cutter is obtained.

Still another object of the invention is to provide a can opener of the character stated wherein means is provided for maintaining a downward thrust on the can driving wheel during the can puncturing operation to retain the oscillatable can driving wheel bearing in the extreme position to which it is urged by the said spring means, for the most efficient puncturing of the end of the can.

A still further object of the invention is to provide, in a can opener of the character stated, an improved bearing construction for the shaft of the disk cutter which allows no longitudinal movement of the disk cutter and shaft in relation to its bearing and an improved bearing construction for the shaft of the can driving wheel which permits such driving wheel to move longitudinally, either to the right or to the left, a predetermined amount in relation to the can driving wheel bearing when a can is engaged in the device, thereby eliminating longitudinal or end thrust in the bearings of the disk cutter and can driving wheel, at all times.

Another object of the invention is to provide, in a can opener of the character stated, coacting cone wheels connected with the disk cutter shaft and with the drive wheel shaft, which when brought into engaged relation produce a wedging action which maintains the can driving wheel firmly under the full depth of the rim or flange of a can, with a relatively small cone formed integral with the shaft of the disk cutter and coaxial with and adjacent to the disk cutter and having such angularity that the lowermost point thereof parallels the top of a can and overlies the can driving wheel in such a manner that the rim of the can is squeezed between said small cone and the said driving wheel to not only improve the radial traction of the teeth of the driving wheel with the under edge of the can rim or flange but also to enable the operator to regulate such traction to the amount required through the medium of a pair of holding handles.

Another object of the invention is to provide, in a can opener of the character stated, an oscillatable bearing for the can driving wheel which permits the can driving wheel to be resiliently forced laterally away from the disk cutter a predetermined amount when necessary, such as when the seam of a can is passing between the cutter and driving wheel.

Another object of the invention is to provide a can opener of the character stated which is designed to be mounted upon a suitable wall supporting bracket structure, employing a combination of spring and cutter carrier means which permits the cutter to move only substantially upwardly and downwardly in relation to an underlying can driving wheel, the said spring means functioning to move the disk cutter upwardly from the underlying can driving wheel when an operating lever is moved to one of two extreme positions to release the can, but urging the said cutter toward the can driving wheel when said lever is oscillated to the other one of its two extreme positions to resiliently provide adequate traction for the efficient feeding of the can through the device for the cutting out of the end of the can.

The invention will be best understood from a consideration of the following detail description taken in connection with the accompanying drawing forming a part of the specification, with the understanding, however, that the invention is not to be limited to the exact details of construction shown and described since obvious modifications will occur to a person skilled in the art.

Referring to the drawings and particularly to the first embodiment of the invention as illustrated in Figs. 1 to 6 inclusive, the numerals 10 and 12 designate respectively upper and lower elongate handles.

The upper handle at its forward end is formed to provide on the inner side thereof, the bearing block portion 14 and in advance of the bearing block portion 14 and terminating the forward end of the upper handle portion is the depending hinge portion 16 through which is formed a transverse pivot bolt opening 18.

The lower handle 12 is provided at its forward end upon the inner side thereof, with a recess 20 and such forward end terminates in the transversely directed spaced hinge ears 22 between which the hinge portion 16 positions and extending transversely through these ears and through the passage or opening 18 of the hinge portion 16 is the hinge bolt 24.

Formed integral with the inner side of the lower handle 12, at the rear side of the recess 20, is the upwardly projecting ear 26 which is apertured as indicated at 28 for the purpose hereinafter set forth.

The bearing block portion 14 has formed transversely of its inner or under face, the semi-circular bearing recess 30 and secured to the inner face of the bearing block portion 14 is the bearing cap 32 which has a semi-circular recess 34 corresponding to the recess 30 and forming therewith a bearing for the disk cutter shaft 36.

The right end of the disk cutter shaft 36 has formed integral therewith the cone wheel 38 while at its opposite end there is carried the small can rim engaging cone 40 which is concentric with and joined to the inner or back face of the disk cutter 42.

Figure 6:
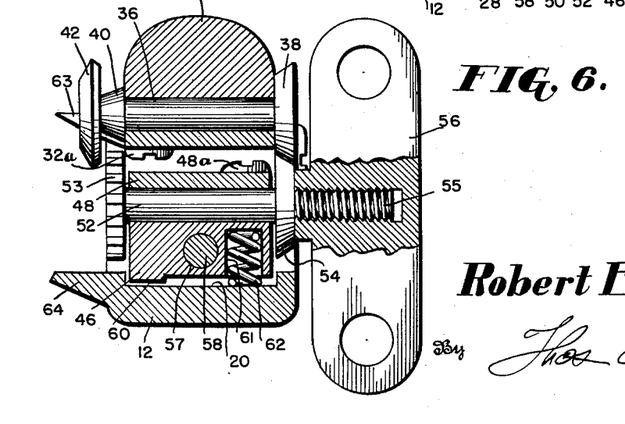
Fig. 6 is a transverse section taken substantially on the line 6—6 of Fig. 4 and shown on an enlarged scale.

The shaft or journal 36, the cone wheel 38, can rim cone 40 and disk cutter 42 are formed or fabricated as a unit in one operation and when the journal is positioned in the bearing it is held in place by the cap 32 and the cone wheel 38 bears against one side of the bearing block portion and the larger end of the can rim cone 40 bears against the opposite face of the bearing block as is clearly illustrated in Fig. 6.

The numeral 44 generally designates an oscillatable bearing which comprises the lower or block portion 46 and the bearing cap 48. The block 46 and bearing cap 48 are provided with the mating semi-circular bearing grooves 50 and 51 forming the bearing in which is positioned the can rim engaging drive wheel shaft 52 which is parallel with the shaft 36, as shown in Fig. 6 and which carries upon its left end the can rim engaging drive wheel 53 and upon its right hand end the cone wheel 54 which cooperates with the cone wheel 38 as illustrated in Fig. 6.

Extending from the outer face of the cone wheel 54 in axial alignment with the shaft 52 is a threaded stem 55 upon which is threadably secured the thumb and finger crank 56 by means of which the drive wheel 53 is rotated.

Figure 1:
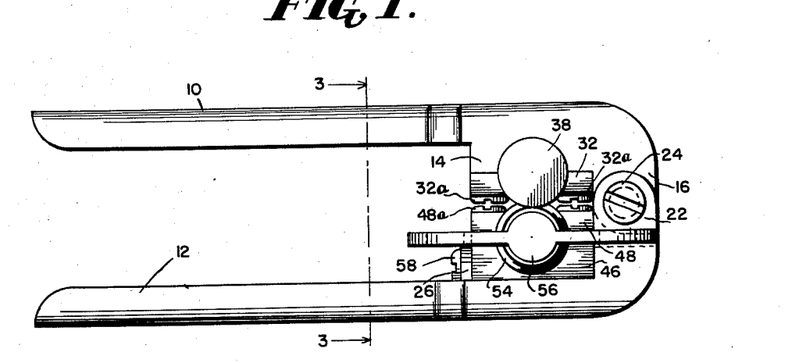
Fig. 1 is a view in elevation of the right side of one embodiment of a rotary drive wheel type can opener constructed in accordance with the present invention.
Figures 2, 3:
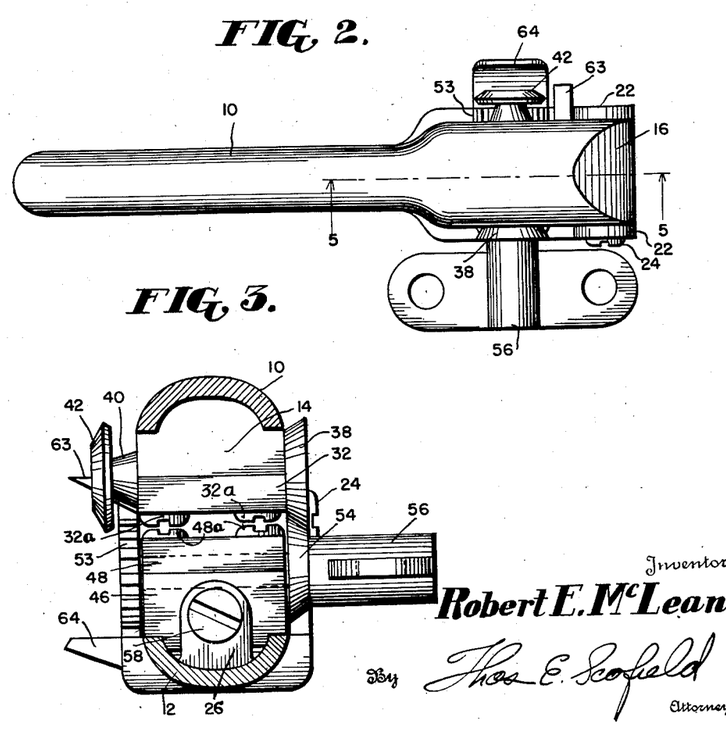
Fig. 2 is a top plan view of the same.
Fig. 3 is a transverse section taken substantially on the line 3—3 of Fig. 1, shown on an enlarged scale.
Figure 4:
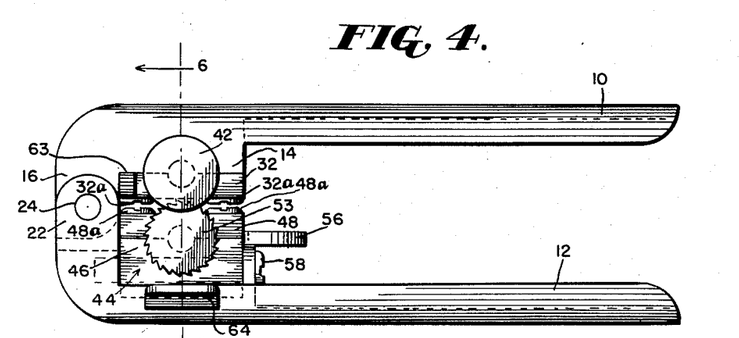
Fig. 4 is a view in elevation of the left hand side of said embodiment.
Figures 5, 20:
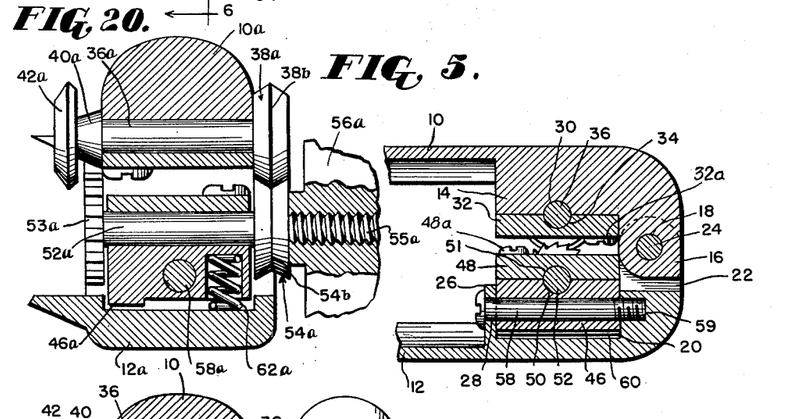
Fig. 5 is a detail section taken substantially on the line 5—5 of Fig. 2.
Fig. 20 is a sectional view corresponding to Fig. 6 but showing the use of double cones in place of the single cones of this and the other figures.

Extending longitudinally through the bearing block 46 at right angles to the shaft 52 is a passage 57 through which extends the pivot screw 58. This pivot screw extends through the opening 28 in the ear 26 and has its inner end threaded into a threaded socket 59 formed in the forward end portion of the lower handle as shown in Fig. 5. Thus the bearing block 46 is supported with its lower part in the recess 20 as shown in Figs. 5 and 6 and is oscillatable on an axis extending longitudinally of the implement.

At the left hand side of the bearing block 46 the under face has a downwardly projecting portion 60 while, the opposite side of the shaft 58 from this portion 60 the bearing block 46 has formed therein, from the lower face thereof, a socket 61 in which is housed an expansion spring 62 which bears at its lower end upon the floor of the recess 20 as illustrated in Fig. 6 and constantly urges oscillation of the bearing block 46 in a counter-clockwise direction or in a direction to lower the drive wheel 53 with respect to the small cone 40 beneath which it is disposed and with which it coacts in the operation of the implement.

Formed as an integral part of the bearing cap 32 on the left hand side thereof and forwardly of the disk cutter 42 is a can rest 63 against the underside of which the top edge of the can rim bears and formed as an integral part of the lower handle 12 on the left hand side thereof and extending outwardly below the rim engaging driving wheel 53, is a can guard 64, against the outer edge of which the side of the can rests when the implement is applied thereto.

The bearing block caps 32 and 48 are secured to their respective blocks in a suitable manner, as for example, by the screws 32a and 48a.

Figs. 7 to 13 illustrate the second embodiment of the present invention, which embodiment is designed to be mounted upon a suitable wall bracket instead of being held in the hand while being used as is the construction above described and illustrated in Figs. 1 to 6 and also the construction illustrated in Figs. 14 to 19 comprising the third embodiment.

In the second embodiment there is provided the body plate 65 which constitutes a supporting arm and which is provided upon its back end with suitable means, not shown, for mounting it on a wall or other support.

At its forward end the body 65 is enlarged to provide the substantially rectangular wall 66 and extending longitudinally of the bottom edge of the body or arm 65 is a right angular flange 67 which forms a floor for the support of certain of the elements as hereinafter described.

The wall portion 66 of the body plate is provided with the opening 68 through which extends the shaft for the hereinafter described drive wheel.

The numeral 69 generally designates a support for the hereinafter described cutter carrier. This support is in the form of an inverted substantially U-shaped frame and comprises the horizontal top part or table 70 having the forward and rear supporting legs 71 and 72 respectively. The forward leg 71 joins at its bottom end with the elongate flat foot 73 which rests upon the floor flange 67 and extends forwardly thereon, terminating in the upstanding, downwardly opening yoke 74.

The rear leg 72 has the short angularly directed foot 75 which, by means of the bolt 76 and cooperating nut 77 is secured to the floor flange as illustrated.

The top or table 70 of the cutter carrier is provided with the two elliptical openings 78 and 79 which are spaced apart longitudinally of such top and which have their long axes longitudinally directed, for the purpose hereinafter set forth.

Resting upon the top of the elongate foot 73 is a bearing cradle which is generally designated 80 and which comprises the bottom or floor portion 81 having at its forward and rear ends the upstanding ears 82 which have aligned apertures for the reception of a pivot bolt 83 corresponding to the pivot screw 58.

Formed integral with the floor 81 of the cradle 80 and extending laterally from the left hand side thereof to project beyond the free left hand edge of the floor flange 67, is the can rest 84.

Figure 9:
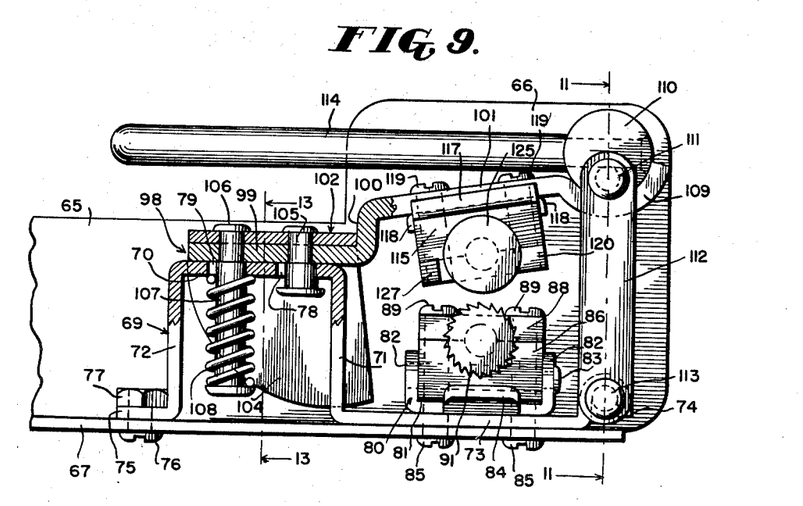
Fig. 9 is a view in elevation of the left hand side of the second embodiment with parts thereof in longitudinal section.
Figures 10, 12:
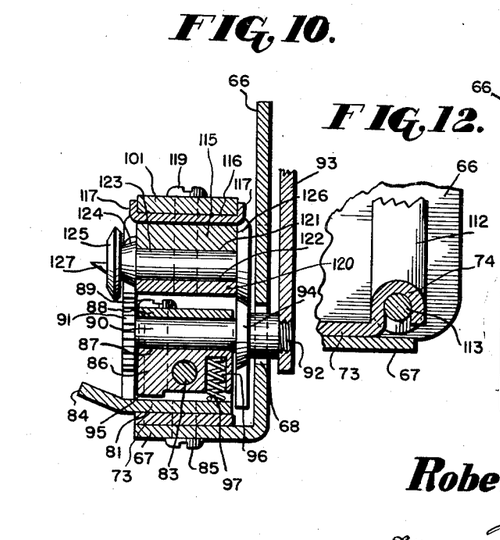
Fig. 10 is a vertical transverse section taken substantially on the line 10—10 of Fig. 7.
Fig. 12 is a detail section taken substantially on the line 12—12 of Fig. 11.

The elongate foot 73 and the cradle 80 are secured to the floor flange 67 by the screws 85 as illustrated in Figs. 9 and 10.

Mounted for oscillation on the pivot bolt 83 is the bearing block 86 which has formed transversely of the top thereof the bearing channel groove 87 and secured to the top of the block 86 is the bearing cap 88 which is maintained in position by the screws 89 as shown.

This bearing cap maintains in position in the bearing groove 87, the shaft or arbor 90 upon the left hand end of which is carried the can driving wheel 91 while the opposite end of this arbor extends through the wall plate opening 68 and is provided with the reduced threaded extension 92 as illustrated, which is threadably engaged in one end of a crank handle 93, the opposite end of which, not shown, carries a suitable hand grip, not shown, or the like.

Also formed integral with the shaft or arbor 90 and positioned on the opposite side of the bearing block 86 from the wheel 91, between the bearing block and the wall 66, is the beveled or cone wheel 94. As shown in Fig. 10 the distance between the cone wheel 94 and the can driving wheel 91 is slightly greater than the width of the bearing block 86 so that the unit, made up of the shaft, driving wheel, cone wheel and crank can have slight axial movement as is the case also in connection with the corresponding structure shown in the first embodiment where, as is shown in Fig. 6, space is provided between the bearing block 46 and the adjacent cone wheel 54 and can driving wheel 53, for slight axial movement of these parts.

As in the previously described oscillatable bearing, the bearing block 86 has provided on its underside the extension 95 while at the opposite side of the pivot bolt 83 from this extension is the downwardly opening spring socket 96 in which is housed the expansion spring 97 which engages the underlying floor 81 of the cradle 80 and constantly urges counterclockwise movement or rotation of the bearing block and parts carried thereby.

The numeral 98 generally designates the cutter carrier which is mounted upon the top 70 of the support 69 as shown. This cutter carrier comprises a straight rear end portion 99 which rests upon the top of and is parallel with the support table 70, the forward upturned or upwardly extending intermediate portion 100 and the forward end portion or resilient arm 101 which extends freely from the forward side of the support 69 across the inner face of the wall 66 as shown in Fig. 9.

Figure 13:
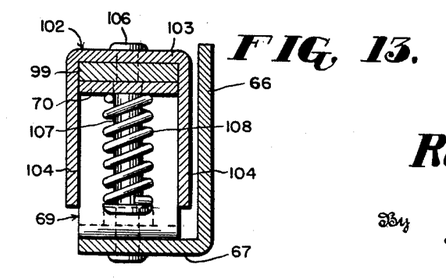
Fig. 13 is a vertical transverse section taken substantially on the line 13—13 of Fig. 9.
Figure 14:
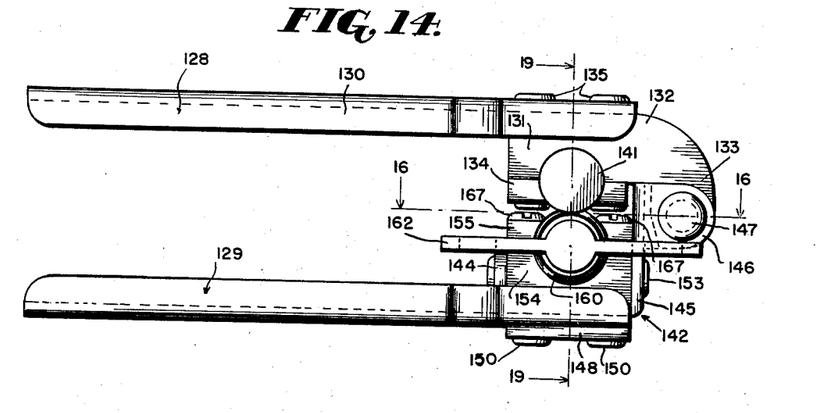
Fig. 14 is a view in elevation of the right hand side of a third embodiment of the invention.
Figures 15, 16:
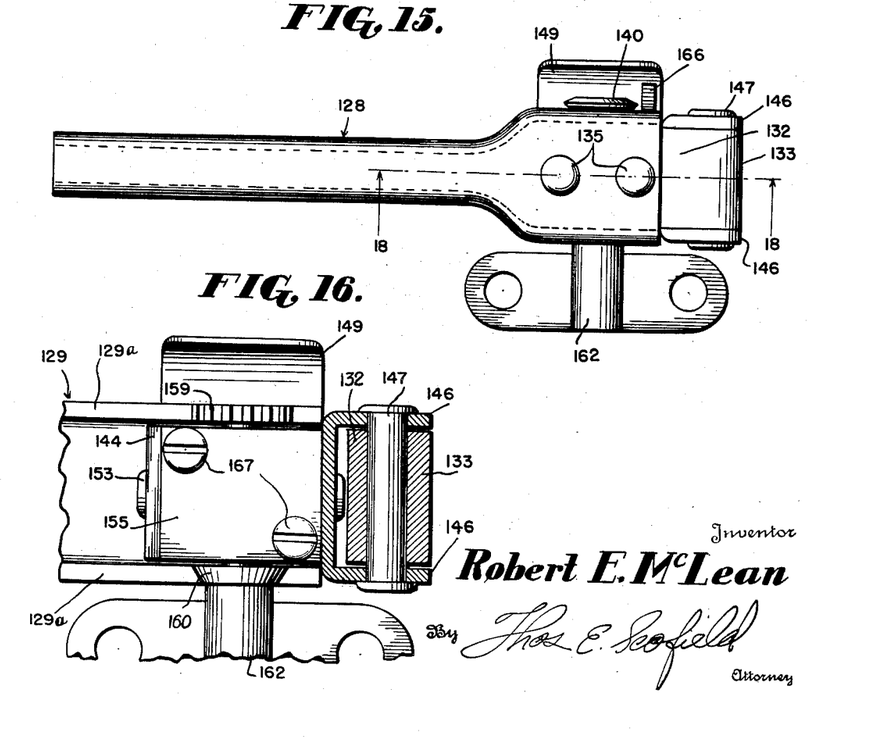
Fig. 15 is a view in top plan of the third embodiment.
Fig. 16 is a horizontal section taken substantially on the line 16—16 of Fig. 14.
Figure 17:
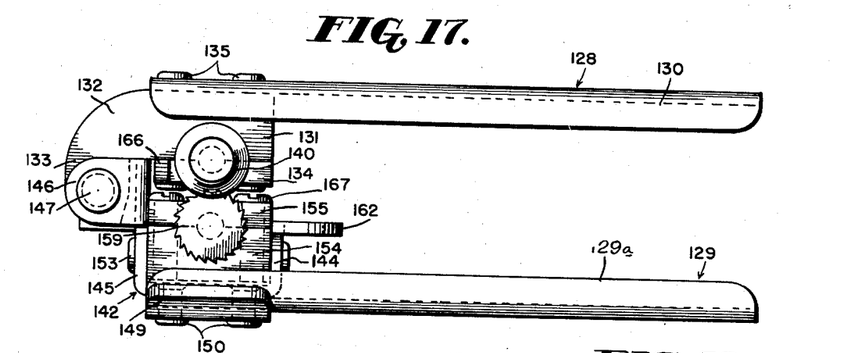
Fig. 17 is a view in elevation of the left hand side of the third embodiment.

The numeral 102 generally designates a saddle which overlies the rear end portion 99 of the cutter carrier. This saddle comprises a central plate portion 103 and the depending segmental wings 104 which, as is best illustrated in Fig. 13, closely embrace opposite sides of the support structure 69.

The saddle and the cutter carrier are secured together by the two rivets 105 and 106.

The forward rivet 105 extends downwardly through the opening 78 and has limited up and down and forward and rearward movement therein as shown while the rearward rivet 106 has an extended lower portion 107 which extends downwardly through the rear opening 79 and which is encased in the expansion spring 108, the lower end of which bears against the head of the rivet while the uper end bears against the underside of the support table 70 as illustrated. This rivet also has slight forward and rearward movement in the opening 79 while upward movement is opposed by the spring 108. By the provision of the saddle 102 across the top of the rear end portion 99 of the cutter carrier, the carrier is maintained in proper or good alignment upon the top of the support.

The resilient arm portion 101 of the cutter carrier terminates in the downwardly bowed portion 109 which provides an upwardly facing bearing surface in which is disposed the eccentric wheel or cylinder 110.

Figure 11:
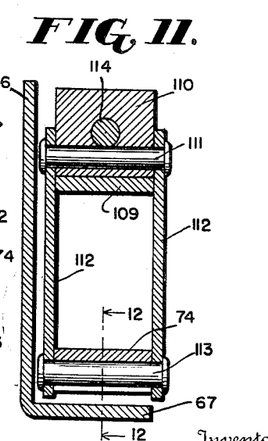
Fig. 11 is a vertical transverse section taken substantially on the line 11—11 of Fig. 9.

Extending eccentrically through the eccentric wheel 110 is the pin 111 which projects at its ends beyond the sides of the eccentric as shown in Fig. 11 and suspended from each projecting end of the pin 111 is a link 112.

The lower ends of the links 112 are coupled together by the connecting pin 113 over which is engaged the yoke 74, as illustrated in Fig. 12.

Secured to and extending radially from the eccentric 110 is the actuating lever 114 by means of which the eccentric is turned or rotated.

The numeral 115 designates the movable bearing block which carries the cutter shaft and attached parts.

Positioned upon the top of this bearing block is an alignment plate 116 which in turn is positioned against the underside of the resilient arm 101, as shown in Fig. 9, between the bearing 109 and the intermediate portion 100. This alignment plate is provided with the upstanding side wings 117 between which the arm 101 is located and at its forward and rear ends the alignment plate has the downturned ears 118 between which the bearing block 115 is located.

Passing downwardly through the top of the arm 101 and through the plate 116 and the bearing block 115, are securing screws 119 which also extend into and secure to the underside of the bearing block the cap plate 120.

Lying in the cooperating grooves 121 and 122 of the bearing block and cap plate respectively is the cutter shaft 123 which upon the left hand end joins the small cone 124 and the disk cutter 125 which is concentric with the cone and the shaft while upon the opposite or right hand end the shaft 123 has secured thereto the cone wheel 126.

The bearing cap 120 carries at the rear side of the cutter wheel, the can rest 127.

As shown in Fig. 9 when the eccentric operating lever 114 is in rearwardly directed horizontal position the high point of the eccentric will be elevated so that the spring arm 101 is permitted to rise to lift the cutter wheel away from the can rim engaging driving wheel and when the lever 114 is thrown over toward the front the eccentric forces the spring arm downwardly to bring the cutter wheel into can top penetrating position.

The third embodiment of the invention is illustrated in Figs. 14 to 19 inclusive wherein the numerals 128 and 129 designate respectively top and bottom or upper and lower handles which, like the handles 10 and 12 of the first embodiment, are designed to be grasped and squeezed together to effect the desired puncturing of the can head and the maintenance of the rotary disk cutter in proper operating relation with the can driving wheel.

These handles 128 and 129 are of channel form and as illustrated the upper handle has the longitudinal side flanges 130 between which, at the forward end of the implement, is positioned the bearing block 131 which has the forwardly and downwardly curving nose portion 132 terminating in the downwardly directed hinge portion 133.

Figure 18:
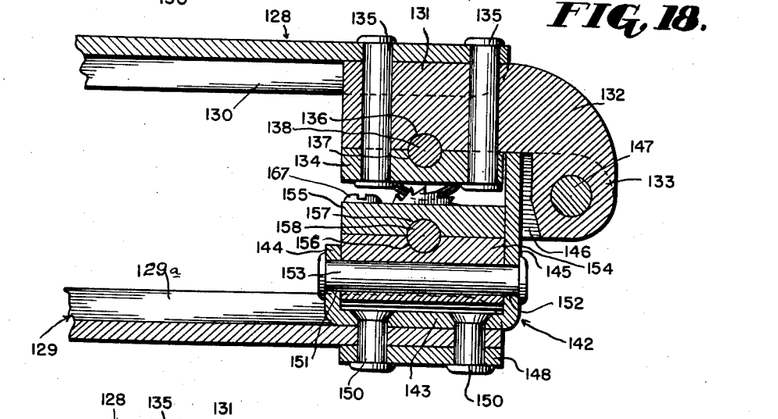
Fig. 18 is a vertical longitudinal section taken substantially on the line 18—18 of Fig. 15 and on an enlarged scale.

The lower face of the bearing block 131 has positioned thereon the bearing cap 134 and this, the bearing block and the handle are all secured together by the long rivets 135 as shown most clearly in Fig. 18.

The opposing faces of the bearing block and the cap are provided with the opposing and coacting bearing grooves 136 and 137 respectively in which is rotatably mounted the shaft or journal 138 of the cutter disk.

Formed integral with the left hand end of the cutter shaft 138 is the small cone 139 and upon the outer side of this cone is formed, coaxial with the cone and shaft, the cutter disk 140.

On the opposite or right hand end of the shaft 138 is secured, concentrically therewith, the cone wheel 141. These parts, as in the other embodiments, are all formed or fabricated as a single unit.

Figure 19:
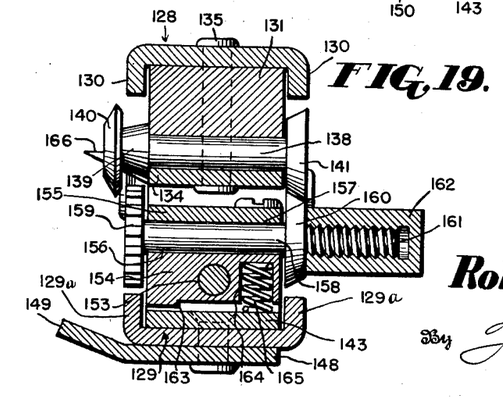
Fig. 19 is a vertical transverse section taken substantially on the line 19—19 of Fig. 14 and on an enlarged scale.

The lower handle 129 is also formed with the longitudinal side flanges 129a and at the forward end of this handle there is positioned between these flanges the cradle unit which is generally designated 142 and which rests upon the inner side of the handle as illustrated most clearly in Figs. 18 and 19.

The cradle unit comprises the bottom or floor portion 143 which extends lengthwise of the handle and at its rear end it is provided with the upstanding ear 144 while at the forward end the bottom or floor 143 joins an upwardly extending wall plate 145 which, at its upper or outer edge, butts against the inner face of the bearing block 131 when the two handles are brought into the parallel relation in which they are shown in the several figures.

Formed integral with the wall plate 145 and extending forwardly from the side edges thereof are the hinge ears 146 between which the downturned hinge portion 133 is positioned and such hinge portion and the ears are provided with suitable aligned openings to have extended therethrough the hinge pin 147 whereby the forward ends of the handles and the parts attached thereto are pivotally coupled together.

Positioned against the under face or outer face of the lower handle 129 is a can guard plate 148, a portion of which projects outwardly and upwardly to provide the can guard 149 which is upon the left hand side, or disk cutter side, of the implement. The forward end of the handle 129, the cradle and the can guard plate 148 are all tightly secured together by the rivets 150 as illustrated in Fig. 18.

The ear 144 and wall plate 145 have aligned openings 151 and 152 respectively to receive the ends of the pivot pin 153 which passes longitudinally through and supports between the ear and wall plate, the drive wheel shaft supporting bearing block 154, for oscillation on an axis extending lengthwise of the handle.

Upon the top of the bearing block 154 is the cap 155 and the block and cap have the opposing bearing channels 156 and 157 respectively in which is rotatably supported the drive wheel shaft 158.

The left hand end of the drive wheel shaft 158 carries the drive wheel 158 while the right hand end has secured thereto the cone wheel 160.

Forming an integral continuation of the shaft from the outer central side of the cone wheel 160, is the threaded stem 161 upon which is threadably mounted the thumb and finger crank 162 by which the drive wheel is rotated.

As will be noted upon reference to Fig. 19, the shaft 158 is of a length between the wheels 159 and 160, slightly greater than the width of the bearing block so that a slight axial movement of the shaft and parts integral therewith is permitted.

As in the previous structures the shaft, can rim engaging drive wheel, cone wheel 160 and threaded stem 161 are all formed as a unit or single part.

The under face of the bearing block 154, on the left hand side thereof has the downwardly projecting extension 163 while at the opposite side of the pivot pin 153 from this extension is the downwardly opening spring socket 164 in which is housed the expansion spring 165 which at its lower end bears upon the underlying floor 143 of the cradle. The action of this spring is the same as the action of the hereinbefore described springs 62 and 97.

The bearing cap 134 has formed integral with the left hand edge thereof a laterally projecting can rest 166 against the underside of which the rim of the can bears when the implement is in use.

While the cap 134 for the upper bearing block 131 is secured by the long rivets 135, the cap 155 for the lower bearing block is secured by the short screws 167 which extend only into the underlying bearing block.

In the operation of the first embodiment illustrated in Figs. 1 to 6 inclusive the spring 62 urges the bearing 46 for the shaft 52 to oscillate in such manner on the pivot screw 58 that the portion 60 of the bearing block will seat on the underlying portion of the handle 12. When so oscillated and the can driving wheel 53 bears laterally against the adjacent side of the bearing block 46, the lateral space between the disk cutter 42 and the can driving wheel 53 is proper for the most efficient puncturing of the end of the can by the said cutter disk. This position of the parts is possible when the handles 10 and 12 are separated.

The device is then placed on the can, with the disk cutter on the end or head of the can and the handles 10 and 12 are squeezed together and so held by one hand while the thumb and finger crank 56 is rotated by the other hand until the end or head is cut out of the can, at which time the handles are separated and the device removed from the can.

As the handles are initially pressed together, the can driving wheel 53 engages firmly under the edge of the rim or flange of the can. Downward thrust of the can driving wheel assures seating of the portion 60 of the bearing block 46 on the underlying portion of the lower handle 12. After the end of the can has been punctured, further pressing together of the handles 10 and 12 causes the cone 38 to engage with the drive wheel shaft cone 54. Further pressing together of the handles causes the bearing block 46 to oscillate slightly clockwise, as viewed in Fig. 6, due to the engagement of the cone wheels 38 and 54, until the rim of the can is vertically squeezed between the teeth of the can rim engaging driving wheel 53 and the overlying cone 40.

Continued squeezing together of the handles not only vertically squeezes the rim of the can between the teeth of the can driving wheel 53 and the overlying cone 40 to provide adequate traction, but the action of the cones 38 and 54 maintains the can driving wheel 53 firmly under the full thickness of the under edge of the can rim or flange at all times for most efficient operation. This wedging action of the cone wheel also maintains the disk cutter 42 firmly against the side wall of the can to assure shearing of the end of the can close to the side wall thereof and such wedging action also prevents the can from assuming a position in respect to alignment with the can opener that would impair maximum operating efficiency.

The can rest 63 prevents the can from tilting in relation to the device as the end of the can is being cut out.

The disk cutter 42 can have substantially no longitudinal movement in relation to its bearing 14.

When a can is engaged in the device a predetermined space exists between the can driving wheel 53 and the adjacent side of the bearing block 46 and a predetermined space also exists between the cone wheel 54 and the adjacent side of such bearing block. Inasmuch as the axes of the two shafts are parallel and the driving wheel 53 does not bear against the adjacent side of the bearing block and the cone wheel 54 does not bear against the bearing block, there is no longitudinal or end thrust in either the bearing for the disk cutter or the bearing for the driving wheel. When the seam portion of the can is passing between the cutter and the can driving wheel, such driving wheel can be resiliently forced laterally away from the cutter as necessary. However, the action of the cone wheels 38 and 54 will firmly maintain the can driving wheel under the full thickness of the under edge of the rim of the can at all times for most efficient operation. Should it happen that the space between the driving wheel and the adjacent end of the bearing is insufficient to permit the driving wheel to be moved away from the disk cutter as necessary, the bearing block 46 can be oscillated slightly clockwise on the pivot screw 58, as viewed in Fig. 6 to permit the easy passage of the seam.

In the second embodiment illustrated in Figs. 7 to 13 inclusive the operation is generally the same as that of the first embodiment. In the second embodiment the spring 97 urges the bearing or bearing block 86 to oscillate in such manner on the pivot bolt 83 that portion 95 of the bearing block will seat on the underlying floor portion 81 of the cradle 80. When so oscillated and the can driving wheel 91 bears laterally against the adjacent side of the bearing block 86, the lateral space between the disk cutter 125 and the can driving wheel is proper for most efficient puncturing of the end of the can by the disk cutter. The can is then held with its end against the under edge of the disk cutter 125 and the lever 114 is oscillated, from the position shown in Fig. 9, approximately 180° clockwise as viewed in Fig. 9, at which time said lever will engage the extreme forward portion of the resilient arm 101 to prevent further oscillation. When the lever is so oscillated, the disk cutter will puncture the end of the can, as it moves from the position shown in Fig. 9 to the position in which it is shown in Fig. 10.

In the foregoing action the cutter carrier 93 fulcrums on the portion 70 of the support 69 at its forward end. The spring 108 urges the forward end of the portion 99 of the carrier to seat on the top of the support 69 at all times.

If the thrust encountered in the puncturing of the end of the can overcomes the resistance of the spring 108, the rivet 105 limits the upward movement of the rearward end of the portion 99 of the carrier to such point that puncturing of the end of the can is assured. After the end of the can has been punctured and the cone wheels 94 and 126 engage each other, the rim of the can is vertically squeezed between the can driving wheel 91 and the overlying cone 124. As the lever 114 is further oscillated clockwise, as viewed in Fig. 9, to its extreme position, the rearward end of the cutter carrier portion 99 is lifted slightly above the top of the support 69, further compressing the spring 108.

Following the preceding operations the spring 108 acts in the same manner as the hand grip on the pair of holding handles in the first and third embodiments of the invention.

Figure 7:
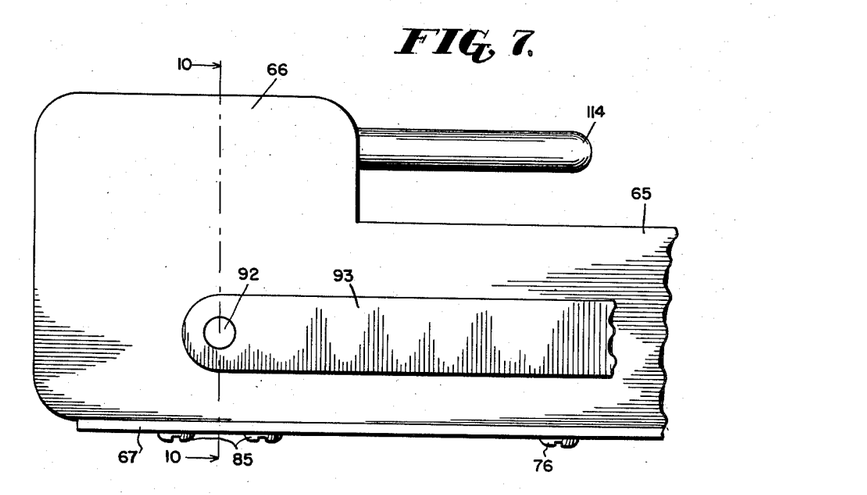
Fig. 7 is a view in elevation of the right hand side of a second embodiment of the invention which is designed to be mounted on a supporting wall bracket.
Figure 8:
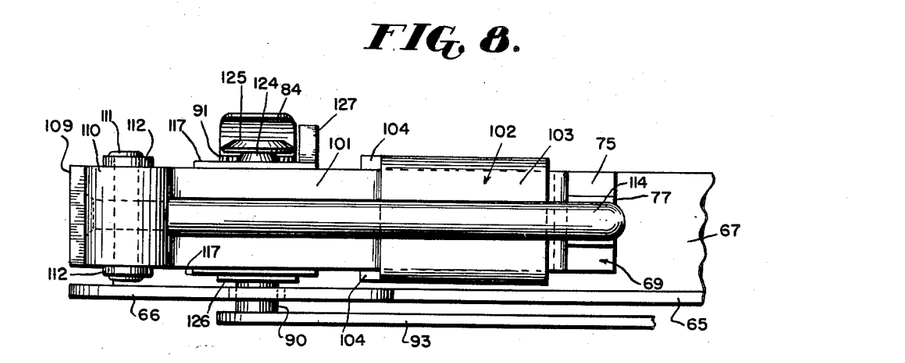
Fig. 8 is a view in top plan of the embodiment shown in Fig. 7.

The crank 93 is then rotated clockwise, as viewed in Fig. 7, until the end of the can is cut out, after which the lever 114 is returned to the position shown in Fig. 9 to release the can from the device and prepare the same for the reception of the next can.

The saddle 102 maintains the cutter carrier in good alignment at all times. The can guard 84 maintains the side wall of the can a predetermined distance away from the lower face or end of the can driving wheel 91 and the can rest 127 prevents the can from tilting in the device while the end of the can is being cut out.

In Fig. 20 there is illustrated a modification relating to the cooperating cones carried by the cutter wheel and drive wheel shafts. While in this figure the other parts of the structure have ben illustrated as being the same as the parts of Fig. 6, it is to be understood that the modified cones are not limited to use with the other elements illustrated in Fig. 20 but may be used in any of the illustrated embodiments of the invention in substitution for the cooperating cones described.

In the structure shown in Fig. 20 the numerals 10a and 12a designate the upper and lower handles.

The numeral 46a designates the oscillatable bearing block which is supported, like the block 46, upon the pivot screw 58a.

Oscillation of the bearing block 46a is constantly urged in one direction by the spring 62a, as in the other constructions.

The numeral 36a designates the cutter shaft upon the right hand end of which is secured a double cone wheel 38a in which the cone halves are arranged to form the peripheral rib 38b.

At the opposite end of the shaft 36a there is formed the can rim cone 40a and coaxial therewith on the outer and smaller end of the cone is formed the disk cutter 42a.

The numeral 52a designates the drive wheel shaft which is rotatably supported by the oscillatable bearing block 46a and upon the left hand end of which is formed the cam rim engaging driving wheel 53a which is in the plane of the cone 40a as in the other embodiments.

At the opposite or right hand end of the shaft 52a is a double cone wheel which is generally designated 54a and in which the two cones are arranged reversely to the cone portions of the wheel 38, whereby to provide the peripheral channel 54b. The angle of the faces of the channel 54b and the angle of the faces of the cone portions or side faces of the rib 38b are the same so that the rib 38b will fit accurately in the channel 54b when the double cone wheels are brought into engaged relation.

Forming an integral extension of the shaft 52a at the right side of the double cone wheel 54a is the threaded stem 55a upon which is threadably secured the thumb and finger crank 56a.

The operation of these double beveled cones is the same as that of the single beveled cones except that cooperation of the two double beveled cones does not wedge the can driving wheel laterally against the disk cutter, but urges the can driving wheel toward the disk cutter only to a point where a predetermined spacing exists between the can driving wheel and the disk cutter. Although the action of the cone 54a in cooperation with the cone 38a does not wedge the can driving wheel toward the disk cutter to a point further than a predetermined spacing between the can driving wheel and the disk cutter, it will be observed that the disk cutter can be forced laterally further away from the can driving wheel than the predetermined spacing when necessary, such as when passing the seam of a can, in the same manner as with the other, or single beveled, type cones.

Having thus described my invention, I claim:

1. In a can opener of the rotary drive wheel type, a first bearing, a first shaft rotatably carried by the first bearing, a disk cutter carried on one end of said shaft in spaced relationship to the bearing, a first cone on the shaft between the first bearing and the disk cutter, a second cone carried on the other end of the first shaft, a second bearing, a second shaft rotatably carried by the second bearing, the second shaft having slight longitudinal play in its bearing, a can rim engaging drive wheel carried on the end of the second shaft adjacent to the cutter disk and at least partly in the plane of the first cone, a third cone on the other end of the second shaft, the second and third cones being at least partially in a common plane and having their cone faces oppositely disposed whereby to be engageable with one another, at least one of said bearings movable toward and away from the other to permit insertion of a can rim between the wheels, the second bearing pivotable at least for a limited arc around an axis at least substantially normal to the first and second shafts and also to the axis of alignment of the two wheels when they are next one another in the can engaging position, and means for moving at least one of said bearings relative the other to engage and disengage a can rim between the cutter, feed wheel and first cone and the second and third cones with one another.

2. A can opener as in claim 1 including means limiting the pivotal motion of the second bearing on its axis in the direction from the cutter wheel to the feed wheel when the shafts are closely aligned relative one another.

3. A can opener as in claim 1 including means limiting the pivotal motion of the second bearing on its axis in the direction from the cutter wheel to the feed wheel when the shafts are closely aligned relative one another and means tending to rotate said second bearing around its pivotal axis in the direction from the cutter wheel to the feed wheel when the shafts are closely aligned relative one another.

4. In a can opener of the rotary drive wheel type, a first bearing, a first shaft rotatably carried by said first bearing, a disk cutter carried on one end of said shaft in spaced relationship to the first bearing, a first cone on the first shaft between the first bearing and the disk cutter, a first double cone having two peripheral faces disposed at an angle to form a peripheral rib carried on the other end of the first shaft, a second bearing, a second shaft rotatably carried by the second bearing, the second shaft having slight longitudinal movement in its bearing, a can rim engaging drive wheel carried on the end of the second shaft adjacent to the cutter disk and at least partly in the plane of the first cone, a second double cone having two peripheral faces disposed at an angle to form a peripheral V-channel in which the rib of the first double cone is adapted to fit on the other end of the second shaft, the first and second double cones being at least partially in a common plane and having their peripheral constructions oppositely disposed whereby to be engageable one with the other, at least one of said bearings movable toward and away from the other to permit insertion of a can rim between the wheels, the second bearing pivotable for at least a limited arc around an axis at least substantially normal to the first and second shafts and also to the axis of alignment of the two wheels when they are next one another in can engaging position, and means for moving at least one of said bearings relative the other to engage and disengage a can rim between the cutter, feed wheel and first cone and the first and second double cones with one another.

5. In a can opener of the rotary drive wheel type, a first bearing, a first shaft rotatably carried by the first bearing, a disk cutter carried on one end of said first shaft in spaced relationship to the first bearing, a first cone on the first shaft between the first bearing and the disk cutter, a second cone carried on the other end of the first shaft, a second bearing, a second shaft rotatably carried by the second bearing, the second shaft having slight longitudinal movement in its bearing, a can rim engaging drive wheel carried on the end of the second shaft adjacent to the cutter disk and at least partly in the plane of the first cone, a third cone on the other end of the second shaft, the second and third cones being at least partially in a common plane and having their cone faces oppositely disposed whereby to be engageable one with the other, a first support mounting the first bearing, a second support mounting the second bearing, means operatively connecting said supports for moving the supports to bring said second and third cone faces into abutting relationship and to move said drive wheel relative to said cone into operative relation with the cutter, means for effecting the relative movement of the supports, and means for rotating the drive wheel carrying shaft.

6. A can opener as in claim 5 wherein the second cone has two peripheral faces disposed at an angle to form a peripheral rib and the third cone has two peripheral faces disposed at an angle to form a peripheral V channel in which said rib is adapted to fit.

7. A can opener as in claim 5 wherein the second bearing is mounted relative the second support for limited oscillation about an axis at least substantially normal to the first and second shafts and also to the axis of alignment of the two wheels when they are next one another in can engaging position.

8. A can opener as in claim 7 including stop means on the second support to limit the pivotal motion of the second bearing on its axis in the direction from the cutter wheel to the feed wheel when the shafts are closely aligned relative one another and means tending to rotate said second bearing around its pivotal axis in such direction.

References Cited in the file of this patent

UNITED STATES PATENTS

| | | |
|---|---|---|
| 2,592,934 | McLean | Apr. 15, 1952 |
| 2,644,228 | McLean | July 7, 1953 |